United States Patent
Long

(10) Patent No.: US 7,334,837 B1
(45) Date of Patent: Feb. 26, 2008

(54) MODULAR MULTI-FUNCTIONAL PORTABLE SEATING DEVICE

(76) Inventor: Dennis Long, 11929 Boyd Rd., Clear Spring, MD (US) 21722

( * ) Notice: Subject to any disclaimer, the term of this patent is extended or adjusted under 35 U.S.C. 154(b) by 28 days.

(21) Appl. No.: 11/426,990

(22) Filed: Jun. 28, 2006

(51) Int. Cl.
*A47C 4/48* (2006.01)

(52) U.S. Cl. .................. 297/16.2; 297/217.1; 297/488; 297/25

(58) Field of Classification Search ............... 297/16.1, 297/16.2, 45, 59, 217.1, 344.18, 487, 488, 297/19, 24, 25
See application file for complete search history.

(56) References Cited

U.S. PATENT DOCUMENTS

| | | | |
|---|---|---|---|
| 6,082,813 A | | 7/2000 | Chen |
| 6,302,479 B1 * | | 10/2001 | Zheng ....................... 297/16.2 |
| 6,439,659 B1 | | 8/2002 | Neubauer |
| 6,454,348 B1 * | | 9/2002 | Wu ........................... 297/16.2 |
| 6,499,804 B1 * | | 12/2002 | Wu ............................... 297/45 |
| 6,575,534 B2 * | | 6/2003 | Chen ..................... 297/411.43 |
| 6,601,912 B1 * | | 8/2003 | Chen ........................... 297/45 |
| 6,629,722 B1 * | | 10/2003 | Tang ........................... 297/45 |
| 6,736,450 B2 * | | 5/2004 | Miyagi ...................... 297/16.2 |

* cited by examiner

*Primary Examiner*—Peter R. Brown
(74) *Attorney, Agent, or Firm*—Crossley Patent Law; Mark Ashley Crossley

(57) ABSTRACT

A modular multi-functional portable seating device that provides individual telescopic legs to accommodate varied and uneven surfaces, the seating device further provides a firearm support which is both removable and adjustable. The frame and other components are durable and light weight. Detachable saddlebags are provided for additional convenience and item storage. A removable footrest is provided. Additional cushions and a strap for securing the seating device to an object are also provided. X-braced legs provide sturdy support.

7 Claims, 5 Drawing Sheets

MODULAR MULTI-FUNCTIONAL PORTABLE SEATING DEVICE

BACKGROUND OF THE INVENTION

Collapsible chairs are prevalent in the prior art. Collapsible chairs offered are designed for even surfaces such as lawns, level campgrounds and the like. However, chairs which can accommodate a hunter or shooter need to meet requirements different from those of a typical collapsible lounge chair. In most cases hunting involves outdoor terrain which may be quite uneven or unlevel. Offering level seating, comfort and stability to a hunter and shooter is therefore a challenge, especially in a collapsible chair. Additionally, a properly designed hunting chair should include a gun rest. The present modular multi-functional portable seating device provides for a plurality of needs of a hunter/shooter, sportsmen and sportswomen.

FIELD OF THE INVENTION

This invention relates to portable seating devices and, in particular, to a modular multi-functional, portable, partially collapsible, light weight, seating device comprised of a flexible seat and other components such as detachable telescoping legs, detachable arm rests, detachable saddle bags, detachable support strap, detachable footrest, and detachable telescoping firearm positioning rail.

DESCRIPTION OF THE PRIOR ART

Prior related art provides collapsible chairs but does not meet the particular needs called for in uneven terrain and in shooting. U.S. Pat. No. 6,082,813 issued to Chen on Jul. 4, 2000 teaches a foldable chair with four coupling members slideably mounted on four legs. A flexible seat is stretched between the legs when expanded. The chair does not provide leg adjustment for uneven terrain. The chair does not provide further features of the present multi-functional device. U.S. Pat. No. 6,439,659B1 issued to Neubauer, Jr. on Aug. 27, 2002 teaches a collapsible portable chair with flexible material panels attached between legs. The chair does not provide for uneven terrain use or for the other needs fulfilled by the present device.

While the above-described devices fulfill their respective and particular objects and requirements, they do not describe a modular multi-functional portable seating device that provides for the advantages of the present modular multi-functional portable seating device. In this respect, the present modular multi-functional portable seating device substantially departs from the conventional concepts and designs of the prior art. Therefore, a need exists for an improved modular multi-functional portable seating device.

SUMMARY OF THE INVENTION

The general purpose of the modular multi-functional portable seating device, described subsequently in greater detail, is to provide a modular multi-functional portable seating device which has many novel features that result in an improved modular multi-functional portable seating device which is not anticipated, rendered obvious, suggested, or even implied by prior art, either alone or in combination thereof.

To attain this, the modular multi-functional portable seating device comprises a collapsible chair. The chair employs couplings which surround the front and back upper legs. The lower couplings are affixed to the bottoms of the front and back upper legs. Four couplings are slideably held around the middle portions of the front and back upper legs. The front couplings partially comprise an extended platform as compared to the other six couplings.

The extended platform provides for the S-bent front legs to be projected slightly forward of the seat, but the seat still be of a square bottom which properly collapses and extends. Each adjacent leg is connected via X-braces. The X-braces provide needed support for outdoor activities such as hunting, fishing, and the like. As the X-braces are pivotal with respect to the cross members of each and as the X-braces are pivotally attached to the couplings, the flexible material seat and chair thereby collapses selectively but does not sacrifice sturdiness. Flexible, removable armrests also collapse. Saddlebags are of the same collapsible material and are removably attached. Other flexible components include cushions for added comfort of the seat and a backrest strap which provides for attachment of the seating device to a tree or other external object. The flexible component material can be any suited to flexibility, durability, and outdoor use. A telescoping lower leg is fitted to each upper leg. Each telescoping lower leg is independently telescopic from within one of the upper legs. The telescoping lower legs provide for the seating device to be leveled on virtually any reasonably accommodating terrain. The telescoping lower legs further provide for seat height adjustment, thereby accommodating a variety of user sizes. The detent pins provide for securing each leg at a chosen height within the front and back upper legs. The front legs include an S-bend which projects the front legs partially forward. Additionally, the top of the front legs further comprises a curve bend. Both bends provide forwardly extended mounting of the firearm support. The firearm support enables a user to rest a firearm, crossbow, fishing pole, or any other chosen device on the front of the chair.

Holes in the curve bends and detent pins in the firearm support also enable the firearm support to telescope as needed. The firearm support is cushioned for comfort and to prevent firearm damage. The cushion and cushion cover are removable, as is the firearm support.

The seating device can be constructed of a variety of materials or combinations of materials. Legs and other components, aside from the seat, armrests, cushion cover, cushions, and saddlebags, are made of aluminum, alloys, plastics, polyvinyls, fibers, polymers, ABS, FRP, and a variety of other suitable materials which offer light weight and strength. The optional detachable footrest is also provided in the same various materials.

Collapsibility provides for the seating device to be removably inserted into the tote bag provided.

Thus has been broadly outlined the more important features of the improved modular multi-functional portable seating device so that the detailed description thereof that follows may be better understood and in order that the present contribution to the art may be better appreciated.

An object of the seating device is to provide a partially collapsible and portable seating device.

Another object of the seating device is to provide for level seating on uneven surfaces.

A further object of the seating device is to provide a firearm support.

Providing a padded firearm support is another object of the seating device.

Additionally, an object of the seating device is to provide for seating height adjustment whereby a plurality of user sizes is accommodated.

And, an object of the seating device is to provide a sturdy seat.

An added object of the seating device is to provide ease of collapsed and expansion.

These together with additional objects, features and advantages of the improved modular multi-functional portable seating device will be readily apparent to those of ordinary skill in the art upon reading the following detailed description of presently preferred, but nonetheless illustrative, embodiments of the improved modular multi-functional portable seating device when taken in conjunction with the accompanying drawings.

In this respect, before explaining the current embodiments of the improved modular multi-functional portable seating device in detail, it is to be understood that the modular multi-functional portable seating device is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved modular multi-functional portable seating device. It is therefore important that the claims be regarded as including such equivalent constructions insofar as they do not depart from the spirit and scope of the modular multi-functional portable seating device. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 7 thereof, the principles and concepts of the modular multi-functional portable seating device generally designated by the reference number 10 will be described.

Figure 1:
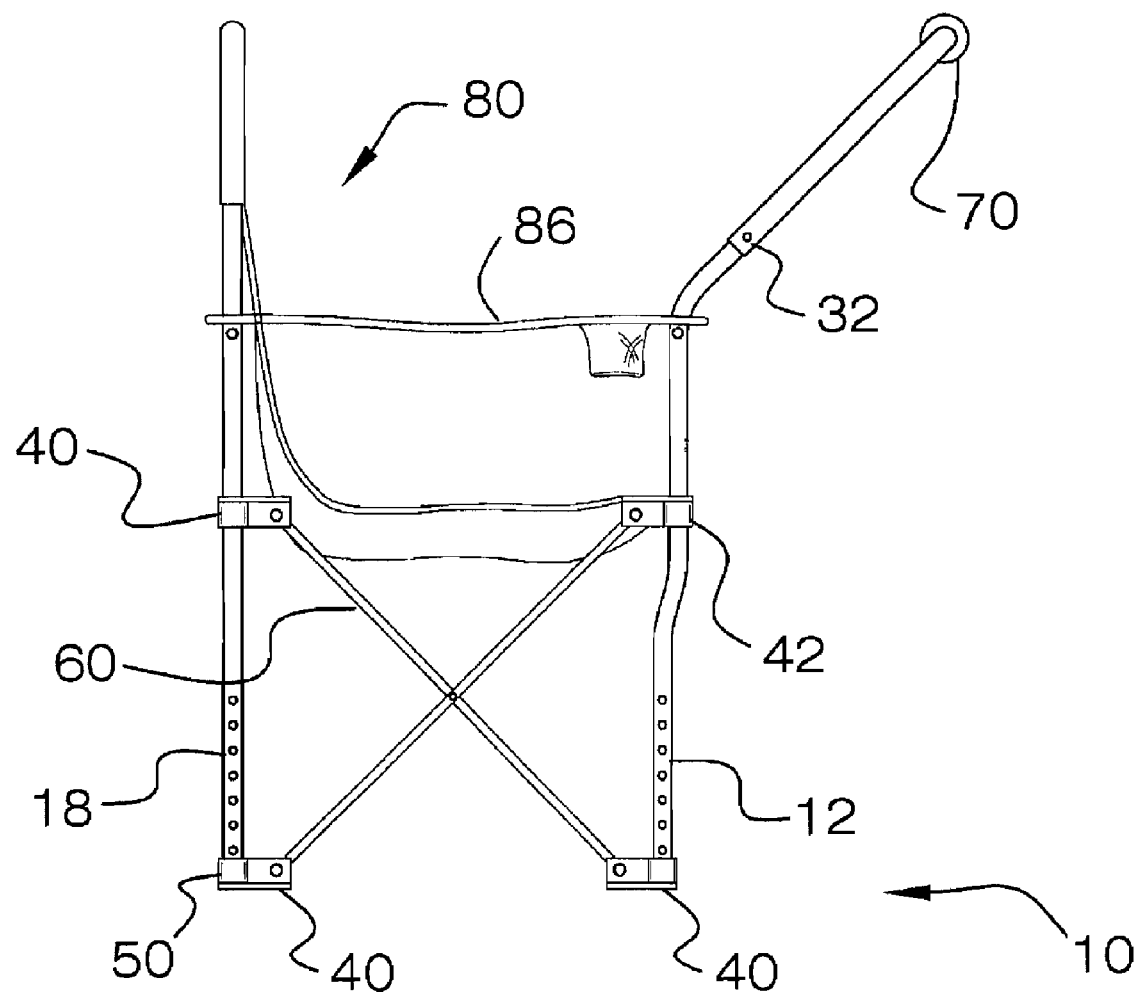
FIG. 1 is a lateral perspective view of the seating device with lower telescoping legs fully receded.
Figure 2:
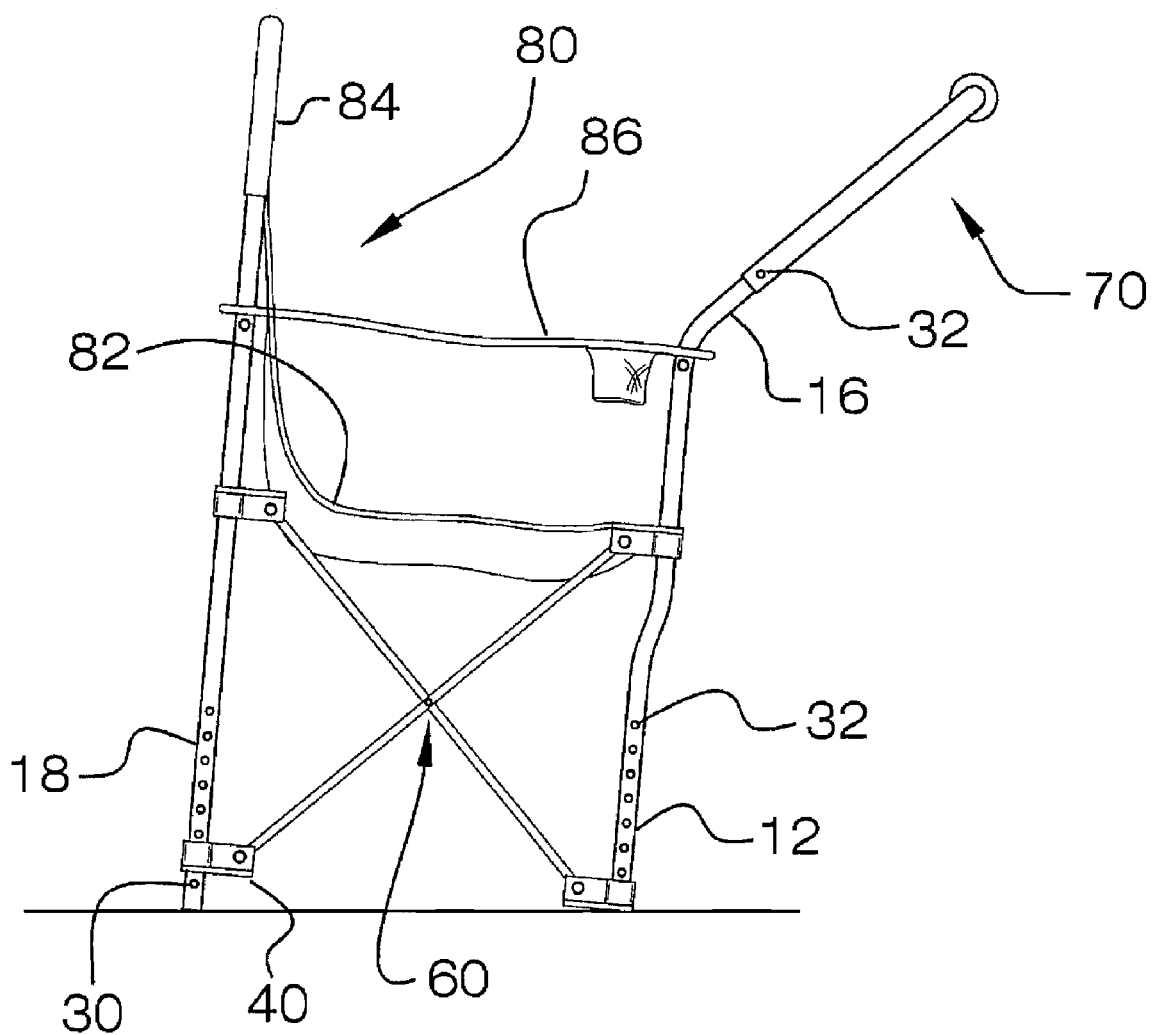
FIG. 2 is a lateral perspective view of the seating device with lower rear telescoping legs partially extended.
Figure 5:
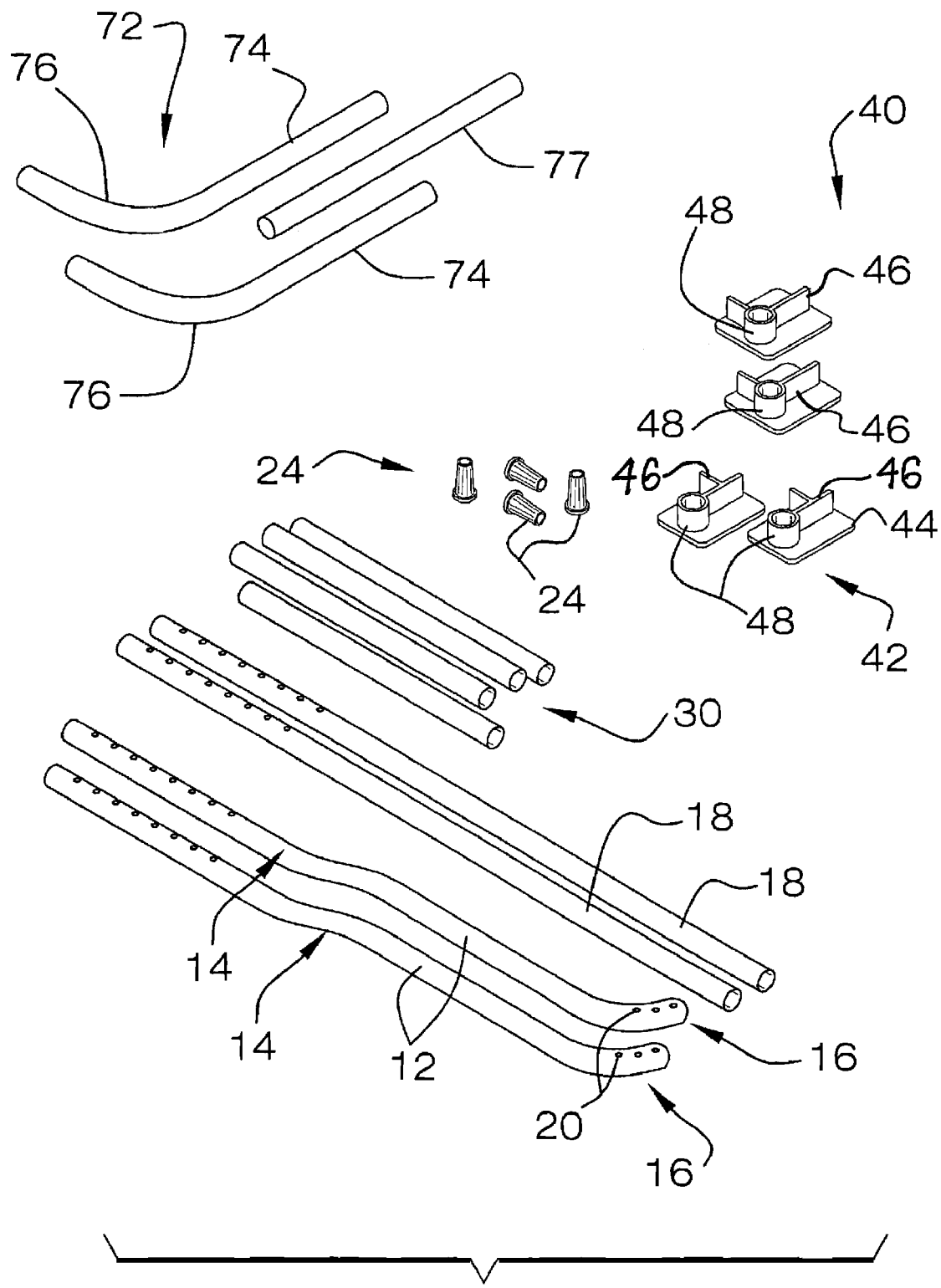
FIG. 5 is a perspective view of some of the components of the seating device.
Figure 6:
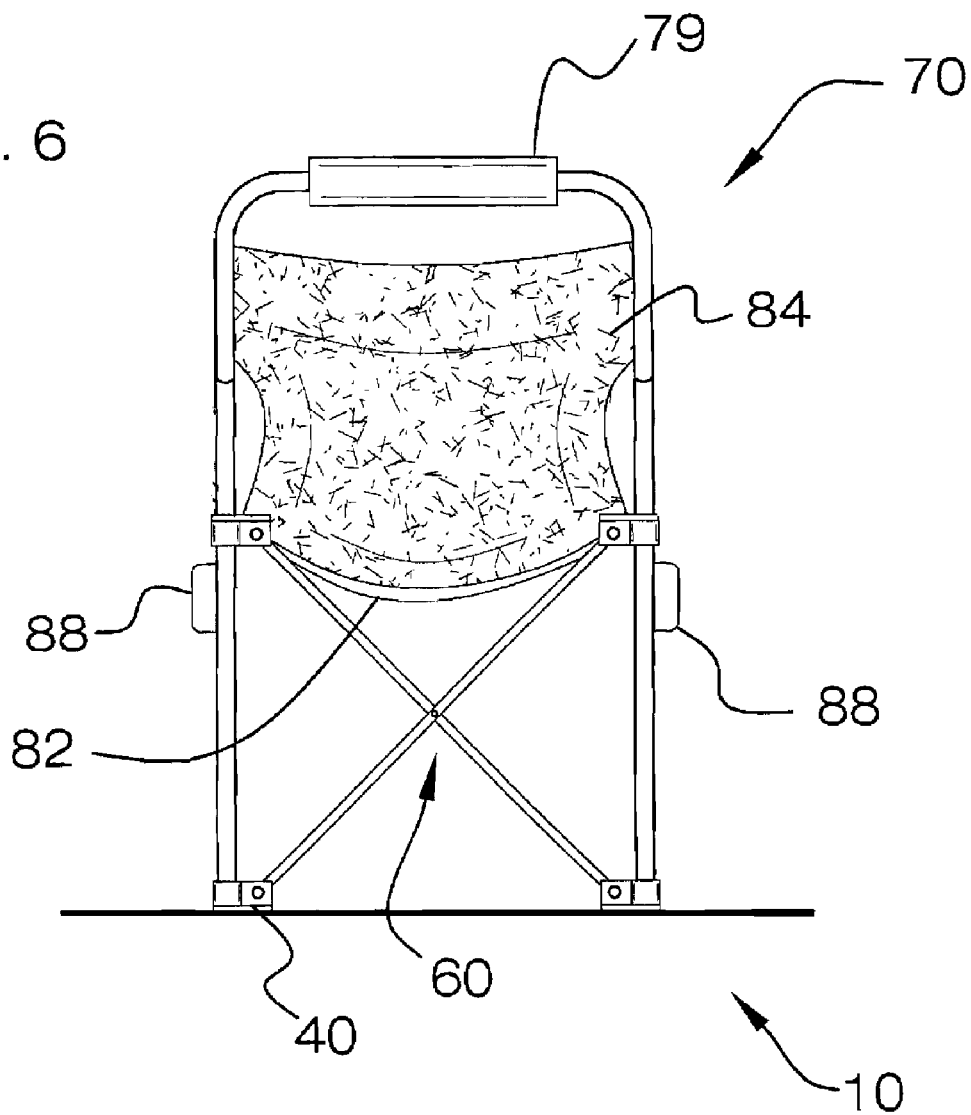
FIG. 6 is a frontal perspective view of the seating device, including optional detachable saddle bags removably affixed to the seat.

Referring to FIGS. 1, 2, and 6, the modular multi-functional portable seating device 10 comprises a pair of hollow front upper legs 12, each having a top portion, a bottom portion, and a middle portion therebetween. Referring also to FIG. 5, each front upper leg 12 partially comprises an S-bend 14 in the middle portion. The curve bend 16 is disposed in the top portion of each front upper leg 12. A plurality of opposing holes 20 is disposed in the top of each curve bend 16. A plurality of opposing holes 20 is disposed in the bottom portion of each front upper leg 12. A pair of hollow back upper legs 18 each has a top portion, a bottom portion, and a middle portion therebetween. Six couplings 40 and two extended couplings 42 are provided. Of the six couplings 40, four lower couplings 40 each comprise a platform 44. The tubular member 48 is disposed on one end of the platform 44. A fastener 50 is provided for each coupling 40 to attach to the bottom of each of the front upper legs 12 and back upper legs 18, whereby the lower couplings are immovably secured. Each coupling 40 is further comprised of two wings 46. Each wing 46 is perpendicular to the other wing 46. Each wing 46 is perpendicular to the platform 44. Each wing 46 radiates from the tubular member 48. Each lower coupling 40 is fastened to the bottom portion of each front upper leg 12 and each back upper leg 18 whereby the wings 46 face upwardly. Two upper couplings 40 are provided. Each upper coupling 40 is identical to each lower coupling 40. One of each upper coupling 40 slideably encircles the middle portion of each back upper leg 18. The wings 46 of the upper couplings 40 face downwardly. Two extended couplings 42 are provided. Each extended coupling 42 comprises a platform 44. A tubular member 48 is disposed on one end of the platform 44 of each extended coupling 42. Each extended coupling 42 further comprises two wings 46. Each wing 46 is perpendicular to the other. Each wing 46 is perpendicular to the platform 44. One of each extended coupling 42 slideably encircles the middle portion of one of the front upper legs 12, whereby the wings 46 face downwardly.

Figure 3:
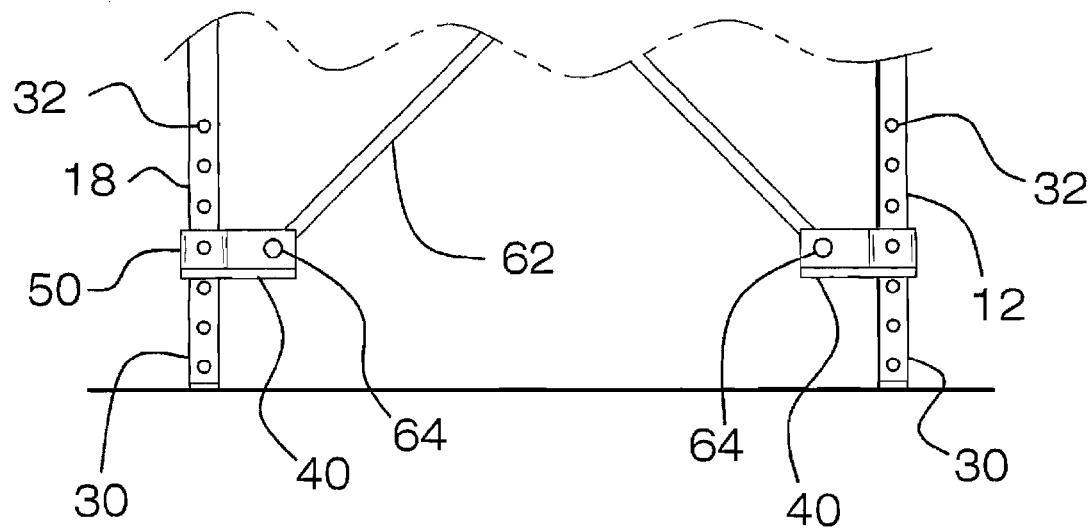
FIG. 3 is a lateral close-up perspective view of all four lower telescoping legs partially extended.

Referring to FIG. 3, the seating device 10 further comprises four X-braces 60. Each X-brace 60 has two cross members 62. The cross members 62 are pivotally attached in the center of each of two cross member 62 via a pivot 64. Each X-brace 60 has four ends. One of each end of each X-brace 60 is pivotally attached to a wing 46 of one of each of the couplings 40 and/or 42, whereby one X-brace 60 is pivotally attached to the lower couplings 40 of the two front upper legs 12. One X-brace 60 is pivotally attached to the lower couplings 40 of the two upper back legs 18. One each of the X-braces 60 is pivotally attached to one of the lower couplings 40 of one of the front upper legs 12 and one of the back upper legs 18. A plurality of opposing holes 20 is disposed in the bottom portion of each back upper leg 18. A plurality of opposing holes 20 is disposed in the bottom portion of each front upper leg 12. Four telescoping lower legs 30 are provided.

A lower leg 30 inserts into each of the two front upper legs 12. A lower leg 30 inserts into each of the two back upper legs 18. A pair of opposing detent pins 32 is disposed in each lower leg 30. Each of the detent pins 32 is for removable insertion into opposing holes 20 of the back upper legs 18 and the front upper legs 12. A foot 24 is provided for insertion into a bottom of each lower leg 30.

The firearm support 70 is provided for insertion into a top of the curve bend 16 of each front upper leg 12. The firearm support 70 comprises a pair of hollow side bars 72. Each side bar 72 comprises a straight section 74. Each side bar 72 also comprises a bend 76 in a one end of each straight section 74. Each bend 76 further comprises an end. A plurality of detent pins 32 is disposed in each straight section 74. The hollow firearm rail 77 slideably fits over the ends of the side bars 72, thereby selectively joining the side bars 72.

Figure 4:
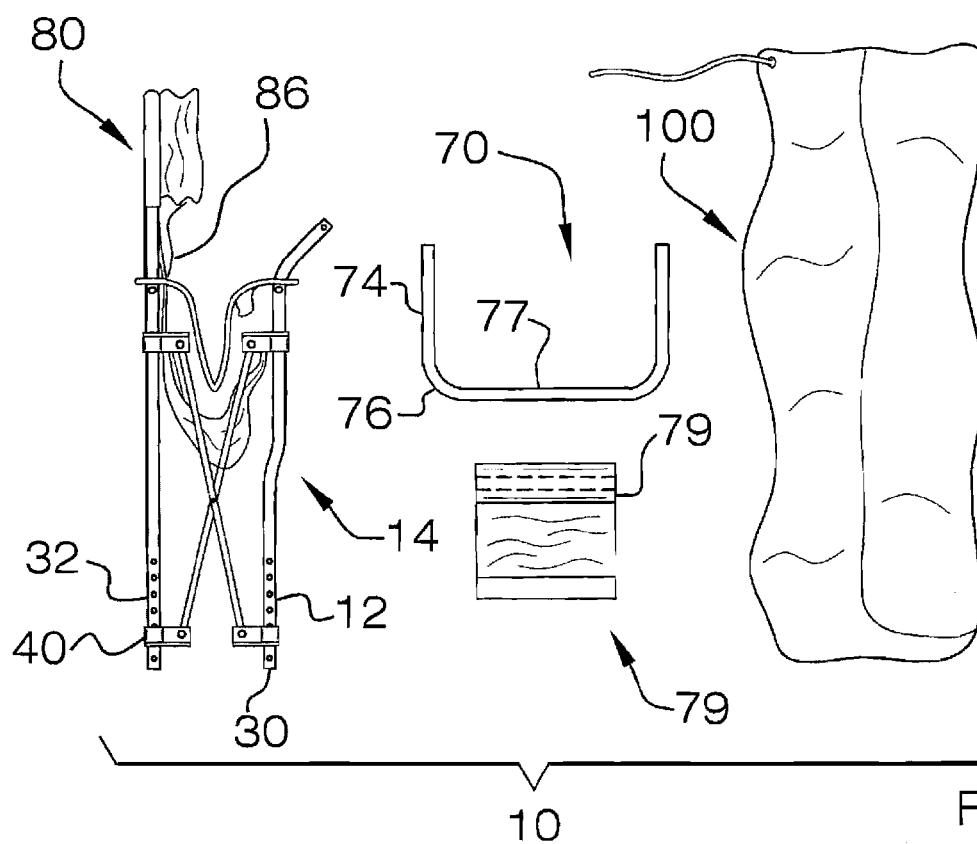
FIG. 4 is a perspective view of the components of one embodiment of the seating device.

Referring to FIG. 4, a round cushion 78 is provided for the firearm rail 77. A cover 79 is provided for the firearm rail 77 cushion 78.

The flexible material seat 80 is suspended between each of the front upper legs 12 and the back upper legs 18. The seat 80 comprises a bottom 82 having a front and two spaced apart side borders. The seat back 84 melds into the seat bottom 82. A saddlebag 88 is removably affixed to each of the two seat bottom 82 side borders. A pair of flexible material armrests 86 is provided. Each armrest 86 suspends from one of the curve bends 16 and one of the back upper legs 18.

Figure 7:
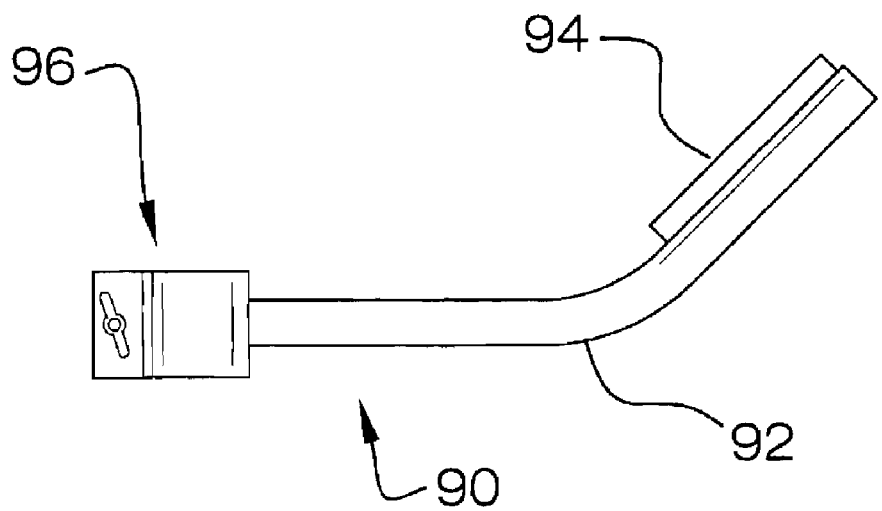
FIG. 7 is a lateral elevation view of the removable footrest.

Referring to FIG. 7 the seating device 10 further comprises a footrest 90 removably affixed to the front upper legs 12. The removable footrest 90 comprises a spaced apart pair of angle bars 92. The rest pad 94 is affixed to one end of each of the angle bars 92. The clamps 96 are affixed to the angle bars 92, one to each bar 92. Each clamp 96 is affixed to an end of one of the angle bars 92 opposite the rest pad 94.

Referring to FIG. 4, the seating device 10 is collapsed. The seating device 10 includes the tote bag 100. In order to collapse the seating device 10, the foot rest 90 of FIG. 7 is removed. The firearm support 70 is removed. The firearm support 70 can also be disassembled as in FIG. 5 for insertion into the tote bag 100. The cushion 78 and cover 79 are removable.

With respect to the above description then, it is to be realized that the optimum dimensional relationships for the parts of the modular multi-functional portable seating device, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the modular multi-functional portable seating device.

Directional terms such as "front", "back", "in", "out", "downward", "upper", "lower", and the like may have been used in the description. These terms are applicable to the embodiments shown and described in conjunction with the drawings.

These terms are merely used for the purpose of description in connection with the drawings and do not necessarily apply to the position in which the modular multi-functional portable seating device may be used.

Therefore, the foregoing is considered as illustrative only of the principles of the modular multi-functional portable seating device. Further, since numerous modifications and changes will readily occur to those skilled in the art, it is not desired to limit the modular multi-functional portable seating device to the exact construction and operation shown and described, and accordingly, all suitable modifications and equivalents may be resorted to, falling within the scope of the modular multi-functional portable seating device.

What is claimed is:

1. A modular multi-functional portable seating device, the seating device comprising:
    a pair of hollow front upper legs, each having a top portion, a bottom portion, and a middle portion therebetween;
    a pair of hollow back upper legs, each having a top portion, a bottom portion, and a middle portion therebetween;
    eight couplings, the coupling comprising;
        four lower couplings; each lower coupling comprising:
            a platform;
            a tubular member on a one end of the platform;
            a fastener for each coupling;
            two wings, each wing perpendicular to the other, each wing perpendicular to the platform, each wing radiating from the tubular member, each lower coupling fastened to the bottom portion of each upper leg, whereby the wings face upwardly;
        two upper couplings, each upper coupling identical to each lower coupling, one of each upper coupling slideably encircling the middle portion of each back leg, the wings of the upper couplings facing downwardly;
        two extended couplings, each extended coupling comprising:
            a platform;
            a tubular member on one end of the platform;
            two wings, each wing perpendicular to the other, each wing perpendicular to the platform, one of each extended coupling slideably encircling the middle portion of one of the front upper legs, whereby the wings face downwardly;
    four X-braces, each X-brace having two cross members pivotally attached in a center of each cross member, each X-brace having four ends, one of each end pivotally attached to a wing of one of each of the couplings, whereby one X-brace is pivotally attached to the lower couplings of the two front upper legs, one X-brace is pivotally attached to the lower couplings of the two upper back legs, and one each of the X-braces is pivotally attached to one of the lower couplings of one of the upper front legs and one of the upper back legs;
    a plurality of opposing holes in the bottom portion of each back upper leg;
    a plurality of opposing holes in the bottom portion of each front upper leg;
    four telescoping lower legs, each lower leg for insertion into the bottom of one each of the two front upper legs and the two back upper legs;
    a pair of opposing detent pins in each lower leg, each of the detent pins for removable insertion into opposing holes of the back upper legs and the front upper legs;
    a firearm support for insertion into a top of the curve bend of each front upper leg;
    a flexible material seat suspended between each of the front upper legs and the back upper legs, the seat comprising:
        a bottom having a front and two spaced apart side borders;
        a seatback melded into the bottom;
    a pair of flexible material armrests, each armrest suspended from one of the curve bends and one of the back upper legs.

2. The seating device in claim 1 wherein a footrest is removably affixed to the front upper legs.

3. A modular multi-functional portable seating device, the seating device comprising:
    a pair of hollow front upper legs, each having a top portion, a bottom portion, and a middle portion therebetween;
    an S-bend in the middle portion of each front upper leg;
    a pair of hollow back upper legs, each having a top portion, a bottom portion, and a middle portion therebetween;
    eight couplings, the coupling comprising;
        four lower couplings; each lower coupling comprising:
            a platform;
            a tubular member on a one end of the platform;
            a fastener for each coupling;
            two wings, each wing perpendicular to the other, each wing perpendicular to the platform, each wing radiating from the tubular member, each lower coupling fastened to the bottom portion of each upper leg, whereby the wings face upwardly;

two upper couplings, each upper coupling identical to each lower coupling, one of each upper coupling slideably encircling the middle portion of each back leg, the wings of the upper couplings facing downwardly;

two extended couplings, each extended coupling comprising:
  a platform;
  a tubular member on one end of the platform;
  two wings, each wing perpendicular to the other, each wing perpendicular to the platform, one of each extended coupling slideably encircling the middle portion of one of the front upper legs, whereby the wings face downwardly;

four X-braces, each X-brace having two cross members pivotally attached in a center of each cross member, each X-brace having four ends, one of each end pivotally attached to a wing of one of each of the couplings, whereby one X-brace is pivotally attached to the lower couplings of the two front upper legs, one X-brace is pivotally attached to the lower couplings of the two upper back legs, and one each of the X-braces is pivotally attached to one of the lower couplings of one of the upper front legs and one of the upper back legs;

a plurality of opposing holes in the bottom portion of each back upper leg;

a plurality of opposing holes in the bottom portion of each front upper leg;

four telescoping lower legs, each lower leg for insertion into the bottom of one each of the two front upper legs and the two back upper legs;

a pair of opposing detent pins in each lower leg, each of the detent pins for removable insertion into opposing holes of the back upper legs and the front upper legs;

a foot for insertion into a bottom of each lower leg;

a firearm support for insertion into a top of the curve bend of each front upper leg, the firearm support comprising:
  a pair of hollow side bars, each side bar comprising:
    a straight section;
    a bend in a one end of each straight section;
    an end of each bend;
    a hollow firearm rail, the rail slideably fitted over the ends of the side bars;
  a cushion for the firearm rail;
  a cover for the firearm rail cushion;

a flexible material seat suspended between each of the front upper legs and the back upper legs, the seat comprising:
  a bottom having a front and two spaced apart side borders;
  a seatback melded into the bottom;

a pair of flexible material armrests, each armrest suspended from one of the curve bends and one of the back upper legs.

4. A modular multi-functional portable seating device, the seating device comprising:
  a pair of hollow front upper legs, each having a top portion, a bottom portion, and a middle portion therebetween;
  an S-bend in the middle portion of each front upper leg;
  a curve bend in the top portion of each leg;
  a plurality of opposing holes in a top of each curve bend;
  a pair of hollow back upper legs, each having a top portion, a bottom portion, and a middle portion therebetween;
  eight couplings, the coupling comprising:
    four lower couplings; each lower coupling comprising:
      a platform;
      a tubular member on a one end of the platform;
      a fastener for each coupling;
      two wings, each wing perpendicular to the other, each wing perpendicular to the platform, each wing radiating from the tubular member,
    each lower coupling fastened to the bottom portion of each upper leg, whereby the wings face upwardly;
    two upper couplings, each upper coupling identical to each lower coupling, one of each upper coupling slideably encircling the middle portion of each back leg, the wings of the upper couplings facing downwardly;
    two extended couplings, each extended coupling comprising:
      a platform;
      a tubular member on one end of the platform;
      two wings, each wing perpendicular to the other, each wing perpendicular to the platform, one of each extended coupling slideably encircling the middle portion of one of the front upper legs, whereby the wings face downwardly;
  four X-braces, each X-brace having two cross members pivotally attached in a center of each cross member, each X-brace having four ends, one of each end pivotally attached to a wing of one of each of the couplings, whereby one X-brace is pivotally attached to the lower couplings of the two front upper legs, one X-brace is pivotally attached to the lower couplings of the two upper back legs, and one each of the X-braces is pivotally attached to one of the lower couplings of one of the upper front legs and one of the upper back legs;
  a plurality of opposing holes in the bottom portion of each back upper leg;
  a plurality of opposing holes in the bottom portion of each front upper leg;
  four telescoping lower legs, each lower leg for insertion into the bottom of one each of the two front upper legs and the two back upper legs;
  a pair of opposing detent pins in each lower leg, each of the detent pins for removable insertion into opposing holes of the back upper legs and the front upper legs;
  a foot for insertion into a bottom of each lower leg;
  a firearm support for insertion into a top of the curve bend of each front upper leg, the firearm support comprising:
    a pair of hollow side bars, each side bar comprising:
      a straight section;
      a bend in a one end of each straight section;
      an end of each bend;
      a plurality of detent pins in each straight section;
    a hollow firearm rail, the rail slideably fitted over the ends of the side bars;
    a cushion for the firearm rail;
    a cover for the firearm rail cushion;
  a flexible material seat suspended between each of the front upper legs and the back upper legs, the seat comprising:
    a bottom having a front and two spaced apart side borders;
    a seatback melded into the bottom;

a pair of flexible material armrests, each armrest suspended from one of the curve bends and one of the back upper legs.

5. The seating device in claim 4 further comprising a footrest removably affixed to the front upper legs.

6. The seating device in claim 5 wherein the removable footrest comprises:

a spaced apart pair of angle bars;

a rest pad affixed to an end of each of the angle bars;

a clamp affixed to each angle bar, each clamp affixed to an end opposite the rest pad.

7. The seating device in claim 6 further comprising a tote bag for removable containment of the seating device.

* * * * *